United States Patent
Dunn

[15] 3,689,588
[45] Sept. 5, 1972

[54] PROCESS FOR DIMERIZATION OF OLEFINS

[72] Inventor: Howard E. Dunn, Evansville, Ind.

[73] Assignee: Phillips Petroleum Company,

[22] Filed: June 18, 1970

[21] Appl. No.: 47,630

[52] U.S. Cl.....................260/683.15 D, 252/431 P
[51] Int. Cl.................................................C07c 3/10
[58] Field of Search............................260/683.15 D

[56] References Cited

UNITED STATES PATENTS

| 3,485,881 | 12/1969 | Zuech...............260/683.15 X |
| 3,536,778 | 10/1970 | Bergem et al.........260/683.15 |
| 3,379,706 | 4/1968 | Wilke...............260/683.15 X |

*Primary Examiner*—Paul M. Coughlan, Jr.
*Attorney*—Young and Quigg

[57] ABSTRACT

A process for the catalytic dimerization of olefins with a catalyst formed from (1) a nickel(II) complex containing organophosphine ligands and a carbon-containing moiety sigma bonded to the central nickel atom, and (2) an alkylaluminum halide activator.

6 Claims, No Drawings

PROCESS FOR DIMERIZATION OF OLEFINS

This invention relates to the dimerization of monoolefins. The invention relates more particularly to the catalytic dimerization of propylene in the presence of an organonickel(II) complex.

The dimerization of the lower monoolefins, for example propylene, continues to be of interest in the synthesis of monomers for addition polymerization, as intermediates in alcohol production by the oxo process, and as intermediates in the manufacture of plasticizers, lube additives, monomers for condensation polymerization, detergent base stock and improved motor fuel.

I have now found that an improved process of dimerizing monoolefins is effected by employing a catalyst composition produced by contacting a hydrocarbon-soluble organonickel(II) and an alkylaluminum halide. The catalyst composition as discussed above is characterized by increased catalytic activity thereby affording an improved monoolefinic dimerization process.

The catalyst of my invention contains organophosphine ligands about the central nickel atom. Examples of some such ligands are: triethylphosphine, tributylphosphine, methyldiphenylphosphine, triphenylphosphine, and the like. The nickel has a valence of two with one bond involving a halogen, for example, fluorine, chlorine, bromine or iodine. The other bond involves a halogenated vinyl or halogenated aryl group. The presence of the latter bond is associated with an unusually high degree of catalytic activity. Examples of suitable halogenated vinyl or halogenated aryl groups include: trifluorovinyl, tribromovinyl, pentafluorophenyl, 2,5-dichlorophenyl, 2-chloro- 4-nitrophenyl, 2,6-difluorophenyl, pentachlorophenyl.

The olefins to which the present dimerization process is directed include cyclic monoolefins having up to about 12 carbon atoms per molecule and acyclic monoolefins having from about two to 12 carbon atoms, inclusive, where the acyclic monoolefin can be a terminal or an internal olefin, branched or unbranched. Examples of suitable monoolefins which can be used according to the present invention are ethylene, propylene, butene-1, butene-2, pentene-1, pentene-2 cyclopentene, cyclohexene, 3,4,5-trimethylyclohexene,3-methylbutene-1 cycloheptene, hexene-2heptene-1, cyclooctene, 4,4dimethylheptene-2, decene-1dodecene-1, and the like and mixtures thereof.

Propylene, for example, may be added to the catalyst either before or after introduction of the alkylaluminum halide. However, it is preferable to add propylene prior to the introduction of the alkylaluminum halide because this addition sequence affords higher propylene conversions. Examples of suitable alkylaluminum halides are ethylaluminum dichloride, diethylaluminum chloride, dihexylaluminum bromide, dimethylaluminum chloride, methylaluminum dichloride and mixtures thereof such as methylaluminum sesquichloride, ethylaluminum sesquichloride and the like.

The dimerization process of my invention is executed in the liquid phase in the presence of a suitable inert organic liquid in which the organonickel(II) catalyst complex is substantially soluble. Suitable solvents comprise aromatic, aliphatic, cycloaliphatic hydrocarbons, chlorinated hydrocarbons, and mixtures thereof, all of which are in the liquid state under the reaction conditions employed. Preferred solvents, for example, are; isooctane, toluene, cyclohexene, tetrachloroethane and chlorobenzene. The preferred solvent employed will be governed to some extent by the specific catalyst components used, and specific olefinic charge. Under the above defined conditions, the olefinic charge is converted to reaction products comprising the dimer thereof. For example, propylene is converted to the 2,3-dimethylbutenes, n-hexenes, 3-methylpentenes and 2-methylpentenes, etc. By control of reaction temperature and catalyst selection, the product distribution as well as yield is to some extent predictable.

The temperature may vary broadly from $-025°$ to $125°C$. The propylene pressure can range from 1 to 150 psig or to the liquification pressure at operating temperature. The molar ratio of alkylaluminum halide to nickel(II) complex may vary from 100/1 to 1/11 preferably 25/1 to 5/1. The concentration of the nickel(II) complex in the solvent is not critical and can range from one-millionth molar to the saturation point, preferably being about 0.1 to 0.00001 molar.

Unreacted olefins, solvent and/or catalyst composition or components thereof may be recycled in part or entirely to the reaction zone. Charge to the process, as well as recycle streams, may be subjected to suitable treatment to effect removal of the undesired components therefrom.

EXAMPLE I

Dimerization of Propylene Over Bromopentafluorophenylbis(triphenylphosphine)nickel(II)

Propylene (5 psig) was added to a 7 oz. glass reactor containing bromopentafluorophenylbis(triphenylphosphine)nickel(II) (0.0830 g., 0.1 mmol) and chlorobenzene (20 ml) followed by the addition of 1.5 ml of a 1M solution of ethylaluminum dichloride in chlorobenzene. The reaction mixture was maintained at 30 psig propylene and 9.2°C for 30minutes. Deionized water (10ml) was added, the organic layer was decanted, and distilled at atmospheric pressure under nitrogen: b.p. 62°–100°C; hexene fraction, 46.29 g.

A 2 ml portion of the distillate was reduced by hydrogenation over platinum oxide to the corresponding hexanes. Analysis (glpc) of the resulting hexanes indicated the composition of the hexene product mixture was: 2-methylpentenes, 69.40 percent; n-hexenes, 19.66 percent; 2,3-dimethylbutenes, 10.13 percent; and 3-methylpentenes, 0.81percent.

EXAMPLE II

Dimerization of propylene Over Chlorotrifluorovinylbis(triethylphosphine)nickel(II)

Propylene (30psig) was added to a 7-oz. glass reactor containing chlorotrifluorovinylbis(triethylphosphine)nickel(II) (0.070 g., 0.1 mmol) and chlorobenzene (20 ml). The reactor and contents were maintained at 9°C with propylene pressure reduction to 5 psig during the addition of 1.5 ml of a 1 M solution of ethylaluminum dichloride in chlorobenzene. The propylene pressure was immediately increased to 30 psig following the addition of the ethylaluminum dichloride. The reaction mixture was maintained at 30 psig propylene and 9°C for 34 minutes. Deionized water (10 ml) was added, the organic layer decanted, and distilled at atmospheric pressure under nitrogen: b.p. 25°–100°C; hexene fraction, 51.75 g.

A 2 ml sample of the distillate was reduced by hydrogenation over platinum oxide to the corresponding hexanes. Analysis (glpc) of the resulting hexanes indicated the composition of the hexene product mixture was 2-methylpentenes, 69.20 percent; n-hexenes, 19.73 percent; 2,3-dimethylbutenes, 10.84 percent and 3-methylpentenes, 0.23 percent.

EXAMPLE III

Dimerization of Propylene Over Chloro-2,5-dichlorophenylbis(triethylphosphine)nickel(II)

Propylene (30 psig) was added to a 7 oz. reactor containing chloro-2,5-dichlorophenylbis(triethylphosphine)nickel(II) (0.0477 g., 0.1 mmol) and chlorobenzene (20 ml). Propylene pressure was then reduced to 5 psig, and 1.5 ml of a 1 M solution of ethylaluminum dichloride in chlorobenzene was added. The propylene pressure was immediately increased to 30 psig and the reaction mixture was maintained at this pressure at 8.7° C for 30 minutes. Deionized water (10 ml) was added, the organic layer was decanted, and distilled at atmospheric pressure under nitrogen: b.p. 25°–100b$L$C; hexene fraction, 68.38 g.

A 2 ml portion of this fraction was hydrogenated over platinum oxide to the corresponding hexanes. Analysis (glpc) of the resulting hexanes indicated the composition of the hexene product mixture was: 2-methylpentenes, 66.30 percent; n-hexenes, 15.68 percent; 2,3-dimethylbutenes, 17.58 percent; and 3-methylpentenes, 0.44 percent.

Other modifications and alterations of this invention will become apparent to those skilled in he art from the foregoing specification, and it should be understood that this invention is not to be unduly limited thereto.

What I claim is:

1. A process for the dimerization of olefins comprising:
    contacting monoolefins having two to 12 carbon atoms per molecule with a halo(halogenated vinyl)bis(triorganophosphine)nickel(II) complex wherein the halogenated vinyl group is sigma bonded to the nickel, in the presence of an alkylaluminum halide activator and a solvent selected from the group consisting of aromatic, aliphatic, cycloaliphatic and chlorinated hydrocarbons.

2. A process according to claim 1 wherein the alkylaluminum halide is ethylaluminum dichloride.

3. A process according to claim 1 wherein the chlorinated hydrocarbon solvent is chlorobenzene.

4. A process according to claim 1 wherein the molar ratio of the alkylaluminum halide to nickel complex is 100:1 to 1:1.

5. A process according to claim 1 wherein the monoolefin is propylene.

6. A process for the dimerization of olefins comprising:
    contacting monoolefins having from two to 12 carbon atoms per molecule with chlorotrifluorovinylbis(triethylphosphine)nickel(II) in the presence of an alkylaluminum halide activator and a solvent selected from the group consisting of aromatic, aliphatic, cycloaliphatic and chlorinated hydrocarbons.

* * * * *